(12) United States Patent
Damnjanovic et al.

(10) Patent No.: US 11,792,845 B2
(45) Date of Patent: Oct. 17, 2023

(54) CHANNEL ACCESS WITH CONDITIONAL VARIABLE ENERGY DETECTION THRESHOLDS IN SHARED FREQUENCY BANDS

(71) Applicant: QUALCOMM INCORPORATED, San Diego, CA (US)

(72) Inventors: Aleksandar Damnjanovic, Del Mar, CA (US); Yisheng Xue, San Diego, CA (US); Maarten Menzo Wentink, Nijmegen (NL); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/389,554

(22) Filed: Jul. 30, 2021

(65) Prior Publication Data
US 2022/0061088 A1 Feb. 24, 2022

Related U.S. Application Data

(60) Provisional application No. 63/067,861, filed on Aug. 19, 2020.

(51) Int. Cl.
*H04W 74/08* (2009.01)

(52) U.S. Cl.
CPC ................. *H04W 74/08* (2013.01)

(58) Field of Classification Search
CPC ............ H04W 74/0808; H04W 74/00; H04W 72/085; H04W 74/085; H04W 74/08; H04B 17/318; H04B 2001/7154
See application file for complete search history.

(56) References Cited

U.S. PATENT DOCUMENTS

| | | | |
|---|---|---|---|
| 2006/0009161 A1* | 1/2006 | Beecher | H04W 28/18 455/67.11 |
| 2015/0009907 A1* | 1/2015 | Merlin | H04W 74/0808 370/329 |
| 2016/0309512 A1* | 10/2016 | Li | H04W 74/0816 |
| 2019/0098658 A1* | 3/2019 | Noh | H04W 74/0808 |

* cited by examiner

*Primary Examiner* — Quoc Thai N Vu
(74) *Attorney, Agent, or Firm* — Hayes and Boone LLP

(57) ABSTRACT

Wireless communications systems and methods related to channel access contention management in a shared radio frequency band are provided. A first wireless communication device performs, during a first time period, a first clear channel assessment (CCA) in a shared radio frequency band based on a first energy detection threshold, wherein performing the first CCA comprises obtaining at least one signal energy measurement. The first wireless communication device then performs, during a second time period subsequent to the first time period, a second CCA in the shared radio frequency band based on a second energy detection threshold, the second energy detection threshold being based on the at least one signal energy measurement. The wireless communication device then transmits, to a second wireless communication device in the shared radio frequency band based on the second CCA, a communication signal.

30 Claims, 7 Drawing Sheets

CHANNEL ACCESS WITH CONDITIONAL VARIABLE ENERGY DETECTION THRESHOLDS IN SHARED FREQUENCY BANDS

CROSS-REFERENCE TO RELATED APPLICATIONS

This application claims the benefit of and priority to U.S. Provisional Application No. 63/067,861, filed Aug. 19, 2020, the entirety of which is incorporated by reference.

TECHNICAL FIELD

This application relates to wireless communication systems and methods, and more particularly to systems and methods for channel access management in shared frequency bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a reservation signal (e.g., a preamble) to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present application describes mechanisms for channel access contention management over a shared radio frequency band (e.g., in an unlicensed spectrum or a shared spectrum). For example, a wireless communication device, such as a base station (BS) or a user equipment (UE), may perform a listen-before-talk (LBT) procedure to determine if a channel is available for transmission. The LBT may include performing a first clear channel assessment (CCA) and a second CCA, each of which includes obtaining one or more signal energy or power measurements, and comparing the measurements to an energy detection (ED) threshold. In some aspects described herein, a first CCA is performed using a first ED threshold, and a second ED threshold to be used for a second CCA is determined based on the signal energy measurement(s) obtained during the first CCA. For instance, the second ED threshold may be higher, or relaxed, compared to the first ED threshold when the signal energy measurement(s) from the first CCA are lower than a certain threshold. The second CCA is performed using the second ED threshold. Using a relaxed ED threshold during the second CCA may reduce the number of failed LBT procedures, which may increase the spectral efficiency and allocation of frequency-time resources on the network.

According to one aspect of the present application, a method of wireless communication performed by a first wireless communication device, the method includes performing, during a first time period, a first clear channel assessment (CCA) in a shared radio frequency band based on a first energy detection threshold, wherein performing the first CCA comprises obtaining at least one signal energy measurement; performing, during a second time period subsequent to the first time period, a second CCA in the shared radio frequency band based on a second energy detection threshold, the second energy detection threshold being based on the at least one signal energy measurement; and transmitting, to a second wireless communication device in the shared radio frequency band based on the second CCA, a communication signal.

According to another aspect of the present disclosure, an apparatus includes a processor and a transceiver. The processor is configured to perform, during a first time period, a first clear channel assessment (CCA) in a shared radio frequency band based on a first energy detection threshold, wherein performing the first CCA comprises obtaining at least one signal energy measurement; and perform, during a second time period subsequent to the first time period, a second CCA in the shared radio frequency band based on a second energy detection threshold, the second energy detection threshold being based on the at least one signal energy measurement. The transceiver is configured to transmit, to a wireless communication device in the shared radio frequency band based on the second CCA, a communication signal.

According to another aspect of the present disclosure, a non-transitory computer-readable medium has program code recorded thereon. The program code includes code for causing a first wireless communication device to perform, during a first time period, a first clear channel assessment (CCA) in a shared radio frequency band based on a first energy detection threshold, wherein performing the first CCA comprises obtaining at least one signal energy measurement; code for causing the first wireless communication device to perform, during a second time period subsequent to the first time period, a second CCA in the shared radio frequency band based on a second energy detection threshold, the second energy detection threshold being based on the at least one signal energy measurement; and code for causing the first wireless communication device to transmit, to a second wireless communication device in the shared radio frequency band based on the second CCA, a communication signal.

According to another aspect of the present disclosure, an apparatus includes means for performing, during a first time period, a first clear channel assessment (CCA) in a shared radio frequency band based on a first energy detection threshold, wherein performing the first CCA comprises obtaining at least one signal energy measurement; means for performing, during a second time period subsequent to the first time period, a second CCA in the shared radio frequency band based on a second energy detection threshold, the second energy detection threshold being based on the at least one signal energy measurement; and means for transmitting, to a wireless communication device in the shared radio frequency band based on the second CCA, a communication signal Other aspects and features aspect of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
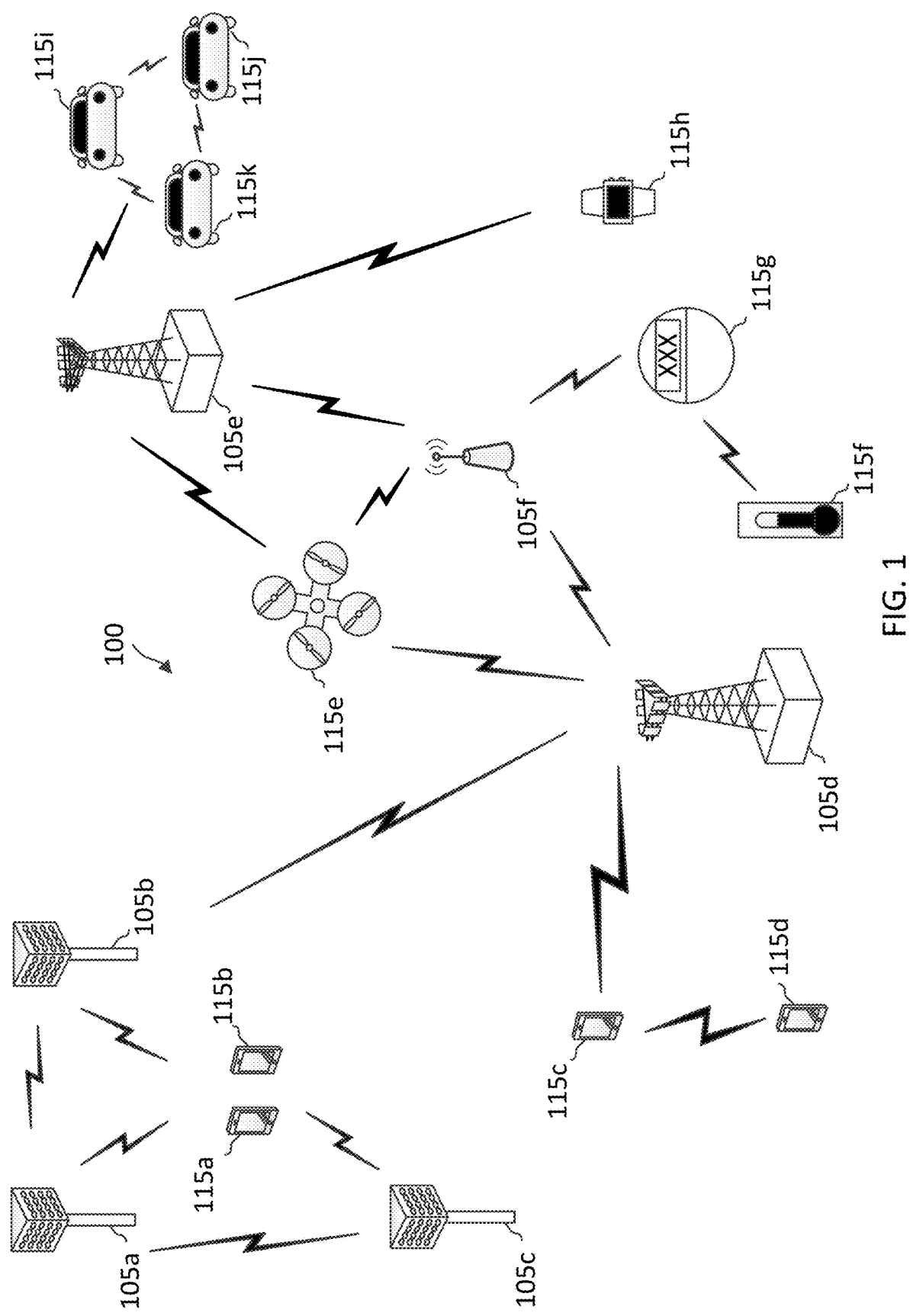
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Some studies have been conducted for NR-U deployment over a 5 gigahertz (GHz) band to support enhanced mobile broadband (eMBB). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. ETIS has adopted a common energy detection (ED) threshold of about −72 decibel-milliwatts (dBm) for clear channel assessment (CCA), which may also be referred to as listen-before-talk (LBT), in 6 GHz bands. In some aspects, a CCA may include multiple stages. For instances, a wireless communication device may perform a first CCA in a channel during a deferral period and may only proceed to perform a second CCA in the channel if the first CCA is a pass (e.g., with detect channel energy below a predetermined ED threshold). The wireless communication device may perform the second CCA over a countdown period (e.g., a random backoff) and may transmit in the channel if the second CCA is also a pass. In some deployments, devices of different classes (e.g., power classes) may apply different ED thresholds for CCA. For example, a UE may apply an ED threshold of about −67 dBm, while a BS may apply a lower ED threshold of about −72 dBm. However, each device in a network may typically apply the same ED threshold for CCAs during a deferral period and during a countdown period.

The present application describes mechanisms for channel access contention management over a shared radio frequency band (e.g., in an unlicensed spectrum or a shared spectrum). For example, a BS and/or a UE may perform a listen-before-talk (LBT) procedure to determine if a channel is available for transmission. The LBT may include performing a first clear channel assessment (CCA) and a second CCA, each of which includes obtaining one or more signal energy or power measurement(s), and comparing the measurement(s) to an ED threshold. In some instances, it may be desirable for a wireless communication device to apply a variable ED threshold, for example, to relax the ED threshold for all or a portion of the LBT based on certain condition(s) to increase the probability of a successful channel access. The mechanisms described herein include performing a first CCA using a first ED threshold, determining a second ED threshold to use for a second CCA based on the signal energy measurement obtained during the first CCA, and performing the second CCA using the second ED threshold. For instance, a wireless communication device performing the LBT procedure may determine whether to use a first reference ED threshold or a second reference ED threshold based on the signal energy measurement obtained during the first CCA. The second reference ED threshold may be greater than the first reference ED threshold, such that the second ED threshold used during the second CCA is relaxed. A relaxed ED threshold may refer to an increased ED threshold, for example, with respect to a reference ED threshold. In some aspects, the wireless communication device may utilize the relaxed ED threshold for the second CCA when the signal energy measurement(s) from the first CCA are below a certain measurement threshold.

Aspects of the present disclosure can provide several benefits. For example, using a relaxed ED threshold during the second CCA (the random back-off) may reduce the number of failed LBT procedures, which may increase the spectral efficiency and allocation of frequency-time resources on the network. Additionally, signal energy measurements may indicate whether a wireless communication device is operating in a network of an isolated deployment. For instance, the network may configure wireless communication devices in the network with synchronous frame structures for channel access. In other words, all wireless communication devices of the network are aware of the deferral periods, and thus may remain silent without accessing the channel during the deferral periods. As such, a wireless communication device can determine whether there are nearby node(s) (e.g. non-synchronous node(s)) that are not part of the network based on signal energy measurements obtained during the first CCA (the deferral period). Therefore, applying the relaxed ED threshold during the second CCA based on signal energy measurements obtained during the first CCA (the deferral) instead of automatically or blindly applying the relaxed ED threshold can allow wireless communication devices to safely increase or relax the ED threshold for the second CCA to increase the probability of a successful channel access without causing collisions or interference to other nearby nodes of another network. Accordingly, the present disclosure can increase spectral usage efficiency and improve coexistence. While the present disclosure is described in the context of NR-U, the present disclosure can be applied to any suitable wireless access technologies.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

Figure 2:
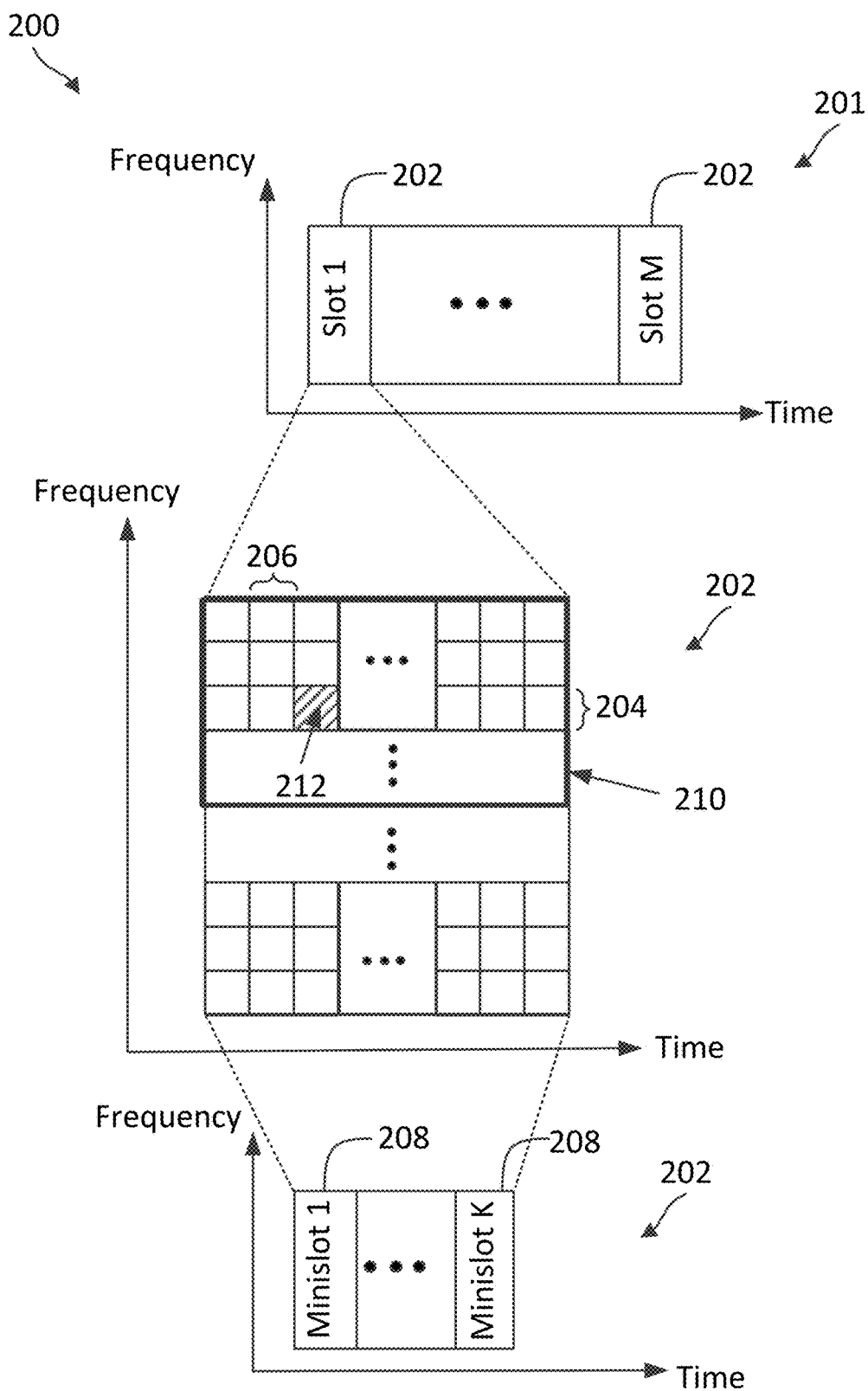
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
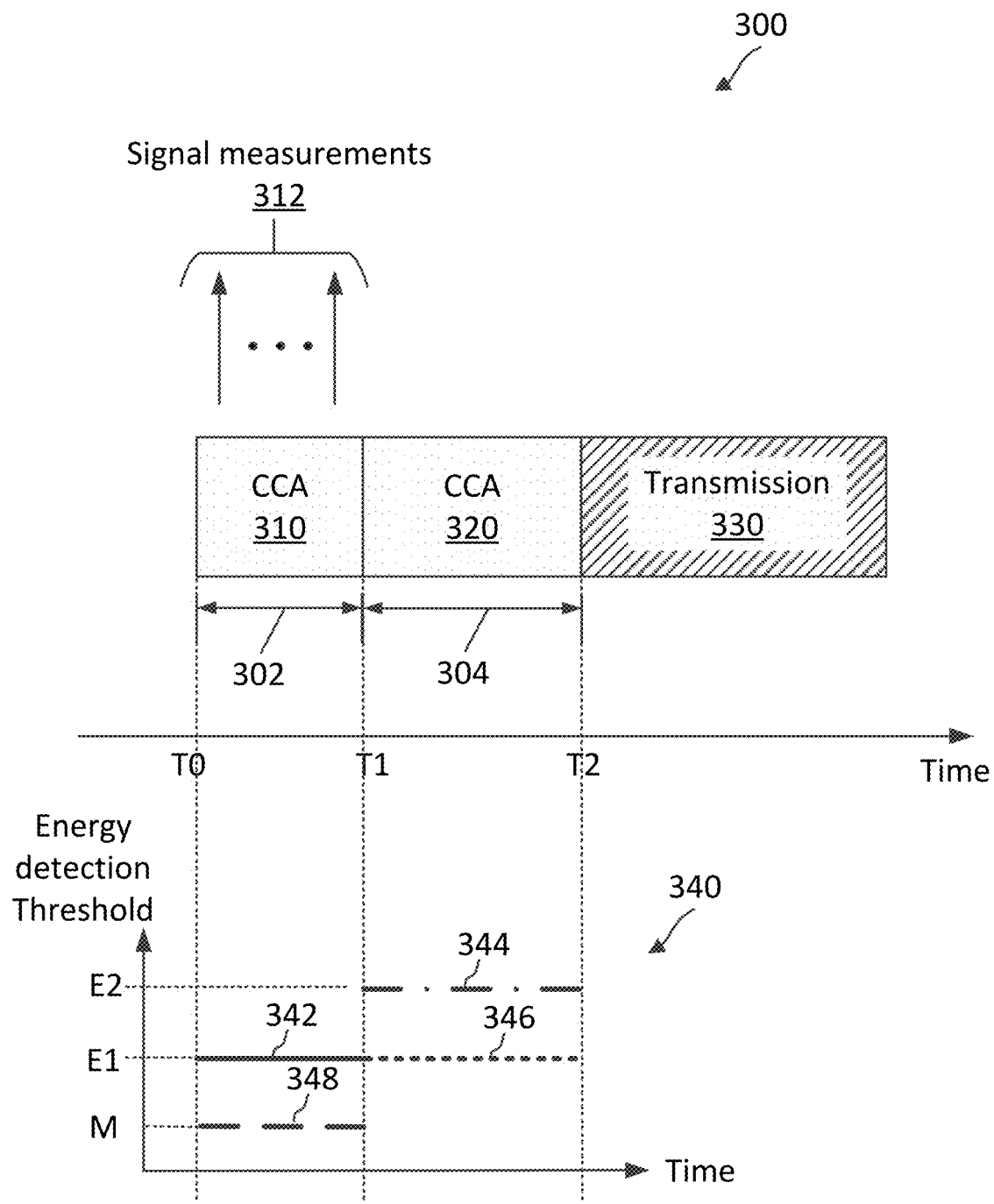
FIG. 3 is a timing diagram illustrating a channel access scheme that utilizes conditional variable energy detection (ED) thresholds according to some aspects of the present disclosure.

FIG. 3 is a timing diagram illustrating a channel access scheme 300 that utilizes conditional variable ED thresholds according to some aspects of the present disclosure. The scheme 300 may be employed by BSs (e.g., the BSs 105) and UEs (e.g., the UEs 115) in a wireless communication network (e.g., the network 100) to communicate over a shared radio frequency band. The BSs and/or the UEs may utilize the radio frame structure 200 for communications in the scheme 300. As explained above, in some instances, it may be desirable for a BS 105 and/or a UE 115 to communicate over a shared frequency band. However, using shared frequency bands often involves dealing with contentions and competition for channel access. LBT procedures may be used to manage channel access in shared frequency bands. A first temporal diagram 300 illustrates an LBT procedure that includes two clear channel assessment (CCA) 310, 320 performed during respective time periods 302, 304. In some aspects, the LBT may be performed according to various LBT parameters, such as a contention window (CW) size, a CW maximum value, a CW minimum value, an energy detection (ED) threshold, a CCA deferral period, and/or an earliest LBT starting time. The LBT parameters can determine the channel access contention or access priority of a transmission. Accordingly, a wireless communication device such as a BS 105 may control the channel access contention priority for transmission in a channel (e.g., a shared radio frequency band) by varying the LBT parameters. For instance, the BS 105 can perform an LBT using certain LBT parameters and transmit a DL transmission upon passing the LBT. The BS 105 may also configure a UE 115 with certain LBT parameters. The UE 115 may perform an LBT using certain LBT parameters and transmit an UL transmission upon passing the LBT.

A BS 105 or a UE 115 may perform the CCAs 310, 320 as part of an LBT procedure to confirm that the channel is sufficiently clear, or silent, prior to transmitting in the channel. If both CCAs 310, 320 indicate a clear channel (e.g., with signal measurements below a threshold), the BS 105 or UE 115 can proceed with the transmission 330. The transmission 330 can include control information and/or data. In some aspects, the shared frequency band may be in the 6 GHz band, including frequencies from 5.925 GHz to 7.125 GHz. However, other shared frequency bands are also contemplated. Additionally, the shared radio frequency band may include any suitable frequency bandwidth (e.g., about 10 MHz, about 20 MHz, about 80 MHz, about 100 MHz, etc.).

As shown in FIG. 3, the BS 105 or the UE 115 may perform a first CCA 310 during a first time period 302 from T0 to T1. The first time period 302 may be referred to as a deferral period. Performing the first CCA 310 includes obtaining signal energy measurements 312 (e.g., in dBm) over all or a portion of the first time period 302. Obtaining the signal energy measurements 312 may be performed using standard energy detection techniques, or any suitable energy detection techniques. For instance, the BS 105 or the UE 115 may perform the first CCA 310 by receiving a signal from the channel, computing a signal energy measurement for the received signal, and comparing the computed signal energy measurement to an ED threshold. In some instances, the BS 105 or the UE 115 may continuously monitor or measure energy in the channel. A duration of the first time period 302 (e.g., T1-T0) may be fixed or variable. In one aspect, the duration of the first time period 302 is based on a priority class-dependent value. In an exemplary aspect, the duration of the first time period 302, or deferral period, is 16 microseconds (us)+n*9 us, wherein n is a positive integer and depends on a priority class of the transmission. Priority class may depend on a traffic type of communication to be transmitted between the BS and UE. For instance, in some aspects, lower n values are assigned to communications of a high-priority class. Some examples of higher priority classes may be associated with a UL URLLC, a DL URLLC, and/or scheduled transmissions.

According to the illustrated aspect, performing the first CCA 310 further includes determining whether one or more of the signal energy measurements 312 obtained during the first time period 302 exceeds an energy detection (ED) threshold. In an exemplary aspect, the wireless communication device (e.g., BS, UE) applies an ED threshold of about −72 dBm, however other ED thresholds may be used, both greater and smaller. Determining whether the one or more signal energy measurements 312 exceeds the ED threshold may include comparing the ED threshold to all of the signal energy measurements 312 obtained during the first time period 302, or a portion of the signal energy measurements 312 obtained during the first time period 302. In one aspect, a maximum signal energy measurement of the signal energy measurements 312 obtained during the first time period 302 is compared to the ED threshold. In another aspect, an average of all the signal energy measurements 312 is computed and compared to the ED threshold. However, comparisons of other representations of the signal energy measurements 312 are also contemplated, including median signal energy measurements, moving average of the signal energy measurements, or any other suitable representation of the signal energy measurements 312. In some aspects, the comparison is performed at or after T1, which is the end of the first time period 302. In other aspects, the comparison is performed continuously or at certain time intervals during the first time period 302, such that, if a given signal energy measurement exceeds the ED threshold at any time during the first time period 302, the first CCA 310 is terminated whether or not the first time period 302 is complete.

If first CCA 310 fails, indicating that the particular shared frequency band is occupied, the BS 105 or UE 115 may repeat or restart the first CCA 310. In some aspects, if the first CCA 310 fails, the BS 105 or UE 115 may wait for some period of time before attempting another CCA. If the first CCA 310 passes, indicating that the signal energy measurement(s) 312 do not exceed the ED threshold, the BS 105 or UE 115 may advance to the second CCA 320, which obtains a second set of signal energy measurements during a respective second time period 304 from T1 to T2. The second time period 304 may be referred to as a countdown period, in some instances. The duration of the second time period 304 (T2-T1) may be variable. In some aspects, the duration of the second time period 304 may be based on a random number associated with a back-off period (e.g., random back-off). The back-off period may be determined in units of slots, mini-slots, or any other suitable unit.

In some instances, the BS 105 and/or UE 115 apply the same ED threshold value for both the first CCA 310 (during the deferral period) and the second CCA 320 (during the countdown). In some situations, the BS 105 or the UE 115 may be part of a coordinated network that coordinates channel access among wireless communion devices (e.g., BSs 105 and/or UEs 115) in the network. For instance, all wireless communication devices may be preconfigured with certain channel access frame structures, where all wireless communications may stay silent (no transmission) during a certain time period including period 302 (the deferral period). Accordingly, the BS 105 and/or the UE 115 may detect low signal measurements during the time period 302. However, if there are nodes of other networks nearby the BS 105 and/or the UE 115, the BS 105 and/or the UE 115 may detect a high signal measurement during the time period 302. In other words, the BS 105 and/or the UE 115 can determine whether the network is an isolated deployment (with no nearby nodes) or not based on signal measurements obtained during the time period 302. If the BS 105 and/or the UE 115 is within an isolated deployment, it may not be necessary for the BS 105 and/or the UE 115 to use the same ED threshold for the second CCA 320 (during the countdown) as the first CCA 310 (during the deferral).

According to an aspect of the present disclosure, the BS and/or UE may apply different ED threshold values during the two time periods 302, 304, in some instances. For example, in one aspect, if the signal energy measurements 312 obtained during the first time period 302 (the deferral period) falls below a first ED threshold, the BS 105 and/or UE 115 may use a relaxed ED threshold value (a higher value) for the second time period 304. In this regard, FIG. 3 includes a graphical representation of the ED thresholds applied during the time periods 302, 304. For the first CCA 310 during the first time period 302 from T0 to T1, a first ED threshold E1 is applied, which may be referred to as a first ED threshold criteria 342. In an exemplary aspect, the ED threshold E1 used by the BS 105 and/or UE 115 may be −72 dBm, or approximately −72 dBm. A relaxed ED threshold used for the second CCA 320 may be −62 dBm, or approximately −62 dBm.

A second temporal diagram 340 is shown in FIG. 3. The second temporal diagram 340 illustrates different ED thresholds applied during the first and second CCAs 310, 320. As illustrated, a first ED threshold criteria 342 of E1 is used for the first CCA 310. If the CCA 310 indicates that the detected energy is below the ED threshold criteria 342 applied during the first time period 302, the BS or UE advances to the second CCA 320 during the second time period 304. The BS or UE determines or selects an ED threshold to use for the second CCA 320. As explained above, the ED threshold used during the second CCA 320 may be determined based on the signal energy measurements obtained during the first CCA 310. For instance, the BS or UE may determine whether to use a second ED threshold criteria 344 having a value of E2, or a third ED threshold criteria 346 having a value of E1. In an aspect, the second ED threshold criteria 344 may correspond to an ED threshold of −62 dBm, where the first ED threshold criteria 342 corresponds to an ED threshold of −72 dBm. However, these values are not to be interpreted as limiting, as other ED threshold values are contemplated for either or both of E1 and E2.

Using a relaxed ED threshold value during the second CCA 320 may improve network efficiency by reducing the number of failed LBT procedures to establish a connection. Because fewer LBT procedures indicate an occupied signal, a greater number of frequency and/or time resources can be allocated to UEs.

In some aspects, the use of the relaxed ED threshold requirement 344 may be automatic. For example, in some aspects, the relaxed ED threshold criteria 344 may be used automatically if first CCA 310 indicates a clear channel based on the first ED threshold criteria 342. However, in another aspect of the present disclosure, the use of the relaxed ED threshold criteria 344 may be conditional or trigger-based. In some aspects, if the signal energy measurements 312 do not exceed a measurement threshold 348 having a value of M that is lower than E1, the BS may proceed to the second CCA 320 using the second ED threshold criteria 344 during the second CCA 320, wherein the second ED threshold criteria 344 is relaxed relative to the first ED threshold criteria 342. If the signal energy measurements 312 are lower than the first ED threshold criteria 342, but exceed the measurement threshold 348, the BS may still proceed to the second CCA 320, but applies the third ED threshold criteria 346, which has a value of E1, equal to the value of the first ED threshold criteria 342 of the first CCA 310. For example, in some aspects, the first ED threshold E1 for the first CCA 310 is about −72 dBm, the measurement threshold M for the first CCA 310 is about −82 dBm, and the conditional relaxed ED threshold value E2 is about −62 dBm. If the signal measurements 312 (e.g., maximum, average) are −85 dBm, the BS proceeds to the second CCA 320 using the relaxed ED threshold value E2 of −62 dBm. If the signal measurements 312 are −75 dBm, the BS proceeds to the second CCA 320 using the same ED threshold E1 used during the first CCA 310. If the signal measurements 312 are above −72 dBm, the LBT procedure is terminated and the BS 105 and/or the UE 115 does not advance to the second CCA 320. The conditionality of the relaxed ED threshold may incentivize cooperation of BSs in the network 100 to use coordinated silencing and maintain low signal energy in a sensing area.

Figure 4:
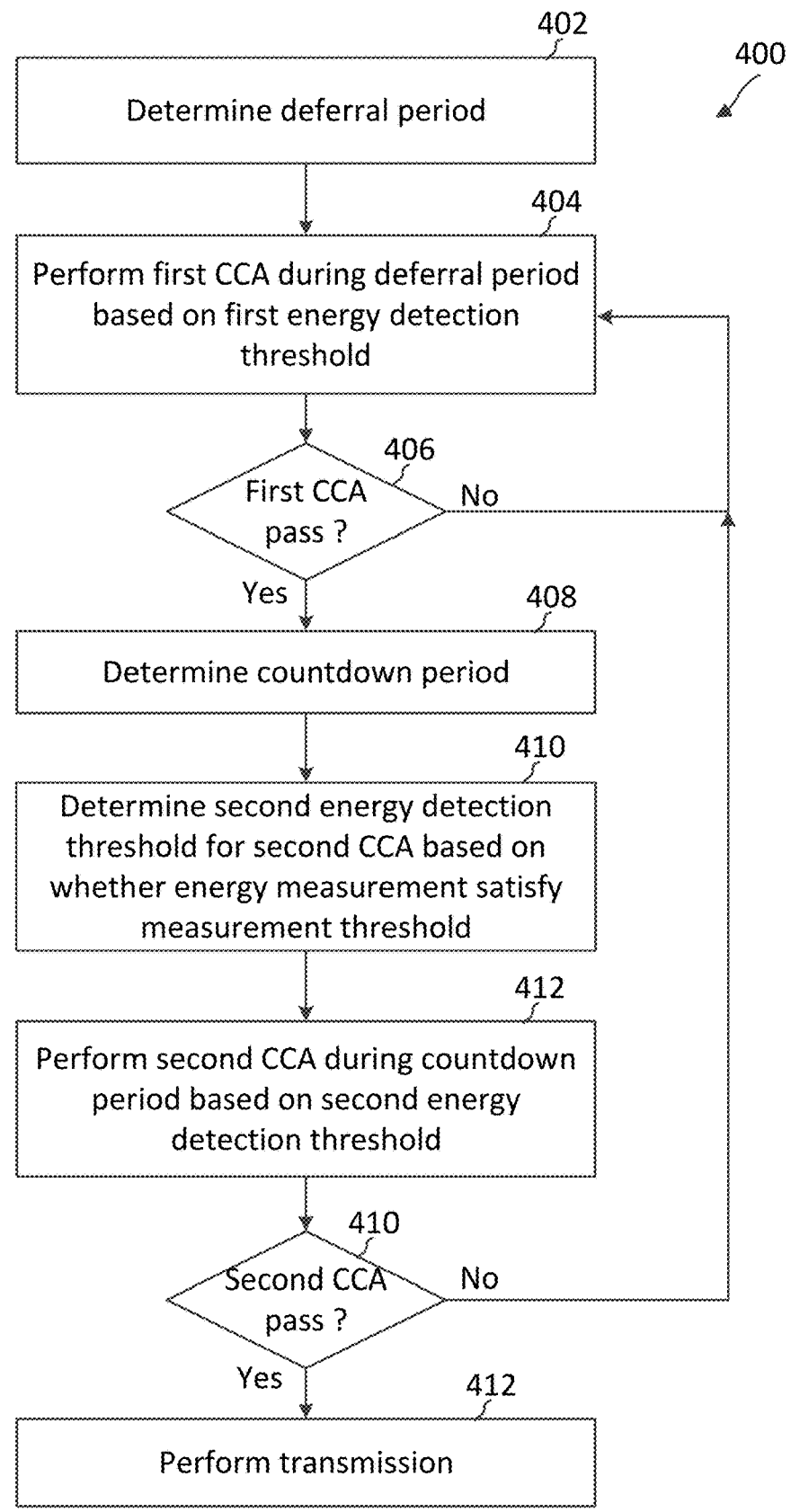
FIG. 4 is a flow diagram of a channel access method that utilizes conditional variable ED thresholds according to some aspects of the present disclosure.

FIG. 4 is a flow diagram illustrating a channel access method 400 that utilizes conditional variable ED thresholds according to some aspects of the present disclosure. Aspects of the method 400 can be executed by a computing device (e.g., a processor, processing circuit, and/or other suitable component) of a wireless communication device or other suitable means for performing the steps. For example, a wireless communication device, such as the UEs 115, may utilize one or more components, such as the processor 602, the memory 604, the channel access module 608, the communication module 609, the transceiver 610, the modem 612, and the one or more antennas 616 of FIG. 6, to execute the steps of method 400. Alternatively, a wireless communication device, such as the BSs 105, may utilize one or more components, such as the processor 502, the memory 504, the channel access module 508, the transceiver 510, the modem 512, and the one or more antennas 516 of FIG. 5, to execute the steps of method 400. The method 400 may employ similar mechanisms as in the scheme 300 discussed above with respect to FIG. 3, respectively. As illustrated, the method 400 includes a number of enumerated steps, but aspects of the method 400 may include additional steps before, after, and in between the enumerated steps. In some aspects, one or more of the enumerated steps may be omitted or performed in a different order.

The method 400 comprises first and second CCAs (e.g., 310, 320), and a transmission between first and second wireless network devices in a shared channel or shared radio frequency band (e.g., in a shared spectrum or an unlicensed spectrum). In some aspects, the shared radio frequency band may be 6 GHz band. It will be understood that the steps of the procedure or method 400 may be determined by a BS (e.g., BS 105) or UE (e.g., UE 115) in a network (e.g., network 100). For example, the method 400 may be performed by a BS such that the transmission is sent to a UE. In other aspects, the method 400 may be performed by a UE such that the transmission is sent to the BS.

At block 402, a first wireless communication device (e.g., BS, UE) determines a deferral period corresponding to a first CCA. The deferral period may be similar to the period 302, and the first CCA may be similar to the CCA 310. In some aspects, the deferral period is fixed. In other aspects, the deferral period is variable. In some aspects, the deferral period is based at least in part on a priority class of a transmission to be transmitted to the second wireless communication device. In some aspects, the priority class is an integer that depends on a contention priority for communicating a certain traffic. In some aspects, the deferral period is calculated as 16 us+n*9 us, where n is the priority class value of transmission to be transmitted to the second wireless communication device.

At block 404, the first wireless communication device performs the first CCA during the deferral period and using a first ED threshold value. Performing the first CCA includes obtaining signal energy measurements during the deferral period. For instance, the first wireless communication device may receive a signal from the channel and compute a signal measurement for the received signal.

At block 406, the first wireless communication device compares the signal energy measurements to the first ED threshold. If the signal energy measurement does not exceed the first ED threshold, the first CCA indicates a "pass." For example, the first ED threshold value may be −72 dBm, or about −72 dBm. If the signal energy measurement is −75 dBm, the first CCA indicates a pass and proceeds to step 408. If the signal energy measurement exceeds the first ED threshold value (e.g., −65 dBm), the first CCA indicates a fail, and repeats the first CCA for a new deferral period. In some aspects, if the first CCA fails, the first wireless communication device waits for some amount of time before repeating the first CCA. In other aspects, if the first CCA fails, the first wireless communication device repeats the first CCA immediately and/or automatically. It will be understood that −72 dBm is not limiting, and that other ED threshold values may be used without departing from the scope of the present disclosure, including values such as −80 dBm, −75 dBm, -70 dBm, −67 dBm, −65 dBm, or any other suitable value, both larger or smaller.

At block 408, the first wireless communication device determines a countdown period. The countdown period may be similar to the period 304. In some aspects, the countdown period is variable. The countdown period may be greater than, equal to, or less than the deferral period. In some aspect, the first wireless communication device may draw a random number, which may be represented as N, within a contention window (e.g., between a CW minimum value and a CW maximum value) and back-off of N number of slots (e.g., slots 202) corresponding to the countdown period.

At block 410, the first wireless communication device determines a second ED threshold to be used for the second CCA. The second ED threshold is determined based on whether the signal energy measurement(s) obtained for the first CCA exceeds (satisfies) a measurement threshold. In an exemplary aspect, the measurement threshold is lower than the first ED threshold, such that the signal measurements must be lower during the deferral period to satisfy the measurement threshold. For example, in an exemplary aspect, the first ED threshold is −72 dBm and the measurement threshold is −82 dBm. If the signal energy measurement(s) obtained during the first CCA is −88 dBm, the second ED threshold for the second CCA may be relaxed or raised compared to the first ED threshold. If the signal energy measurement(s) obtained during the first CCA is −78 dBm, the first ED threshold is used for second CCA. It will be understood that these values are not to be interpreted as limiting and other values for the first ED threshold, second ED threshold, and/or measurement threshold are also contemplated by the present disclosure. For example, the first ED threshold, the second ED threshold, and/or the measurement threshold may have values such as −90 dBm, −85 dBm, −80 dBm, −75 dBm, −70 dBm, −67 dBm, −65 dBm, and/or any other suitable values, both larger or smaller.

At block 412, the first wireless communication device performs the second CCA using the second ED threshold determined at block 410. The second CCA may be similar to the CCA 320. Performing the second CCA includes obtaining additional signal energy measurements during the countdown period determined in step 408, which may be referred to as the second time period similar to the period 304. For instance, the first wireless communication device may receive a signal from the channel and compute a signal measurement for the received signal.

At block 414, the first wireless network device compares the signal energy measurements obtained during the countdown period to the second ED threshold determined in step 410. If the signal energy measurements obtained during the countdown period do not exceed the second ED threshold, then the second CCA indicates a "pass." The second ED threshold value may be the same as the first ED threshold, or may be different from the first ED threshold as determined in step 410. For example, if, in step 410, it is determined that a relaxed ED threshold may be used for the second ED threshold during the countdown period, the second ED threshold may be −62 dBm. If the signal energy measurement is −68 dBm, the second CCA indicates a pass and proceeds to step 416. If the signal energy measurement exceeds the second ED threshold value (e.g., −55 dBm), the second CCA indicates a fail, and repeats the first CCA for a new deferral period. In some aspects, if the second CCA fails, the first wireless connection device waits for some amount of time before repeating the first CCA. In other aspects, if the second CCA fails, the first wireless connection device repeats the first CCA immediately and/or automatically.

Figure 5:
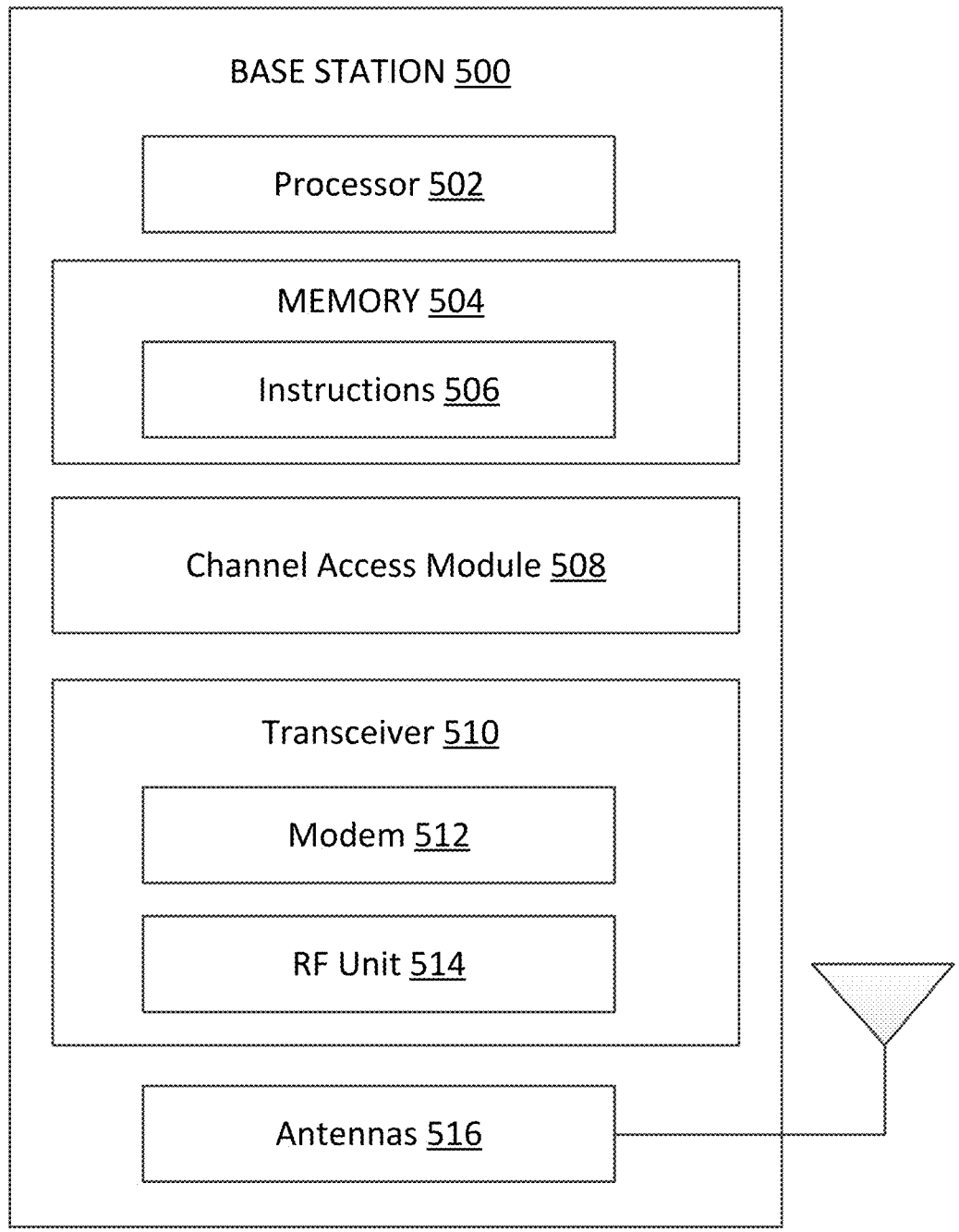
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, a channel access module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4 and 7. Instructions 506 may also be referred to as code, which may be interpreted broadly to include any type of computer-readable statement(s) as discussed above with respect to FIG. 4.

The channel access module 508 may be implemented via hardware, software, or combinations thereof. For example, the channel access module 508 may be implemented as a processor, circuit, and/or instructions 506 stored in the memory 504 and executed by the processor 502. In some instances, the channel access module 508 can be integrated within the modem subsystem 512. For example, the channel access module 508 can be implemented by a combination of software components (e.g., executed by a DSP or a general processor) and hardware components (e.g., logic gates and circuitry) within the modem subsystem 512.

The channel access module 508 may communicate various components of the BS 508 to perform various aspects of the present disclosure, for example, aspects of FIGS. 1-4 and 7. For instance, the channel access module 508 is configured to perform a first CCA and a second CCA in a shared frequency band at respective first and second time periods. The first time period may be a deferral period, and the second time period may be a countdown period. The channel access module 508 may be configured to perform the CCAs using respective ED thresholds. For example, the channel access module 508 may be configured to compare signal energy measurements obtained during each time period to a respective ED threshold to determine whether the CCA passes or fails to satisfy the ED threshold requirement. In some aspects, the channel access module 508 is configured to indicate a pass or fail by, for example, providing a pass signal or a fail signal to another of the modules of the BS 500.

In some aspects, the channel access module 508 is configured to perform the first CCA based on a first ED threshold and perform the second CCA based on a second ED threshold. The channel access module 508 is further configured to determine the second energy detection threshold based on a comparison of a signal energy measurement measured during the first CCA to a measurement threshold, where the measurement threshold is lower than the first ED threshold. The channel access module 508 may be further configured to determine the second ED threshold by assigning a first reference energy detection threshold to the second ED threshold in response to the signal energy measurement failing to satisfy the measurement threshold, or assigning a second reference energy detection threshold to the second energy detection threshold in response to the signal energy measurement satisfies the measurement detection threshold, where the second reference energy detection threshold is greater than the first reference energy detection threshold. The channel access module 508 is further configured to transmit in the shared radio frequency band upon passing the second CCA.

In some aspects, the channel access module 508 is configured to determine a channel access contention priority for the grant (e.g., based on the traffic priority of the UL transmission), determine one or more LBT parameters (e.g., a CW size, a CW maximum value, a CW minimum value, a ED threshold, a number of CCA deferral slots, and/or an earliest LBT starting time) for the LBT configuration based on the determine channel access priority. When the grant is for a high-priority traffic (e.g., URLLC), the channel access module 508 is configured to select a smaller CW size, a higher ED threshold, a less number of CCA deferral slots, and/or an earlier time for the LBT starting time for the LBT configuration. When the grant is for a low-priority traffic (e.g., eMBB traffic), the channel access module 508 may be configured to select a larger CW size, a lower ED threshold, a greater number of CCA deferral slots, and/or a later time for the LBT starting time for the LBT configuration.

In some aspects, the channel access module 508 is configured to decrease the channel access priority of the earlier scheduled SUL transmission or the earlier configured CG-UL transmission, for example, to prioritize a higher priority traffic (e.g., URLLC) of the UE, a higher priority traffic or another UE, or DL traffic of the BS 500. For instance, the channel access module 508 is configured to modify the LBT configuration by increasing the CW size, decreasing the ED threshold, increasing the number of CCA deferral slots, and/or postponing the LBT starting time to decrease the channel access contention priority configured by the LBT configuration and include the modified LBT parameters) in the LBT configuration modification.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., PDCCH, PDSCH, configured grants, dynamic scheduling grants, RRC configuration, LBT configuration, LBT configuration modification, COT SI, DL eMBB data, DL URLLC data) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 600 (FIG. 6) according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUCCH, PUSCH, SUL data, CG-UL data, eMBB data, URLLC data) to the channel access module 508 for processing. The antennas 516 may include multiple antennas of similar or different designs in order to sustain multiple transmission links.

In some aspects, the processor 502 is configured to communicate with components of the BS 500 to perform, during a first time period, a first clear channel assessment (CCA) in a shared radio frequency band based on a first energy detection threshold, where performing the first CCA includes obtaining a signal energy measurement. The processor 502 is further configured to perform, during a second time period subsequent to the first time period, a second CCA in the shared radio frequency band based on a second energy detection threshold, where the second energy detection threshold is different from the first energy detection threshold and based on the signal energy measurement. The transceiver 510 is configured to communicate with components of the BS 500 to transmit, to a second wireless communication device (e.g., the UEs 115) in the shared radio frequency band based on the second CCA, a communication signal. In some aspects, the transceiver 510 can also be configured to communicate, with the second wireless communication device, a communication signal in response to a successful LBT procedure performed by the channel access module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
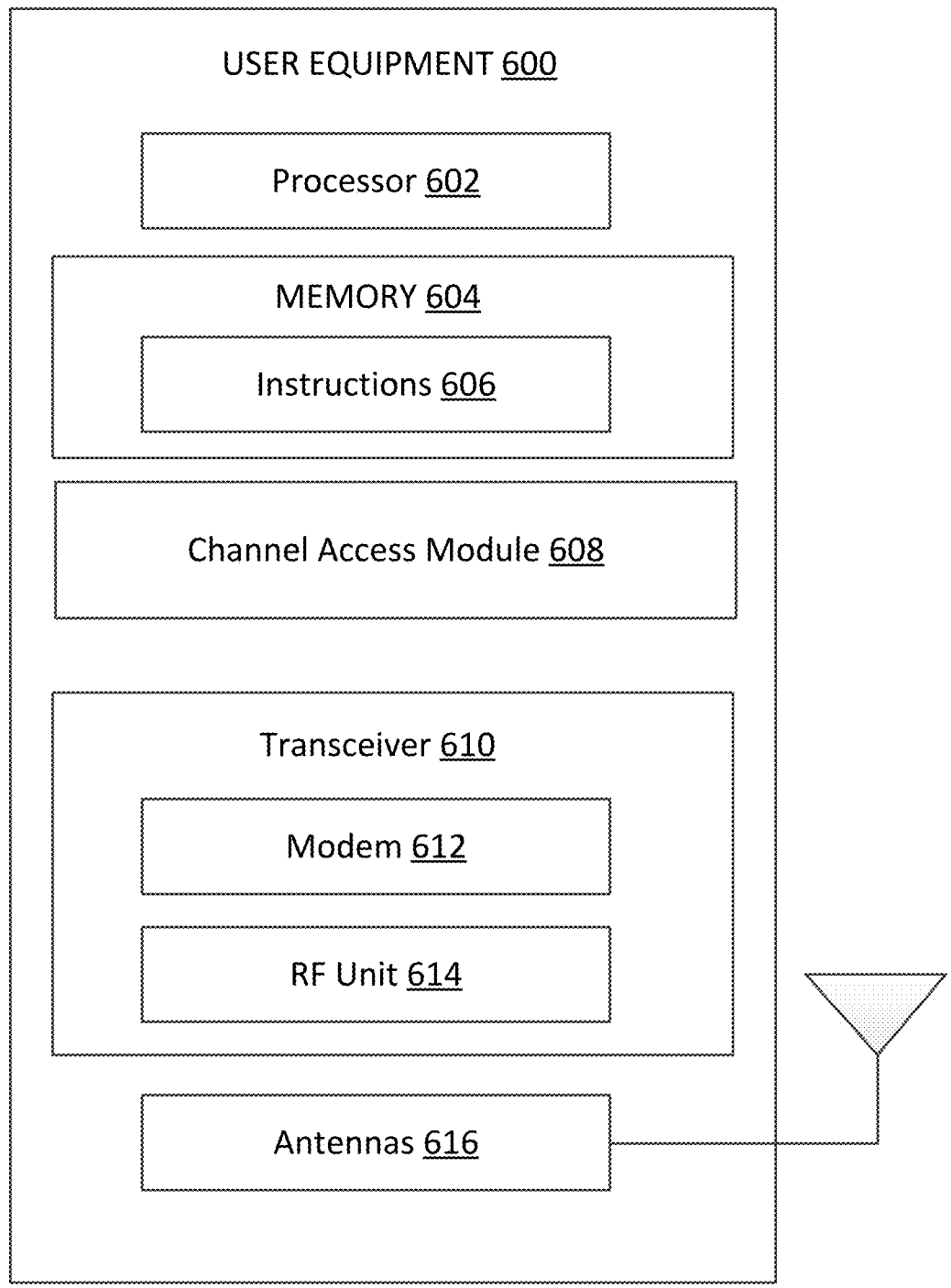
FIG. 6 is a block diagram of an exemplary user equipment (UE) according to some aspects of the present disclosure.

FIG. 6 is a block diagram of an exemplary UE 600 according to some aspects of the present disclosure. The UE 600 may be a UE 115 discussed above in FIG. 1. As shown, the UE 600 may include a processor 602, a memory 604, a channel access module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 1-4 and 7. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel access module 608 may be implemented via hardware, software, or combinations thereof. For example, the CCA module 408 may be implemented as a processor, circuit, and/or instructions 606 stored in the memory 604 and executed by the processor 602. In some instances, the channel access module 608 can be integrated within the modem subsystem 612. For example, the channel access module 608 can be implemented by a combination of software components (e.g., executed by a DSP or a general processor) and hardware components (e.g., logic gates and circuitry) within the modem subsystem 612.

The channel access module 608 may be used communicate various components of the UE 608 to perform for various aspects of the present disclosure, for example, aspects of FIGS. 1-4 and 7. For instance, the channel access module 608 is configured to perform a first CCA and a second CCA in a shared frequency band at respective first and second time periods. The first time period may be a deferral period, and the second time period may be a countdown period. The channel access module 608 may be configured to perform the CCAs using respective ED thresholds. For example, the channel access module 608 may be configured to compare signal energy measurements obtained during each time period to a respective ED threshold to determine whether the CCA passes or fails to satisfy the ED threshold requirement. In some aspects, the channel access module 608 is configured to indicate a pass or fail by, for example, providing a pass signal or a fail signal to another of the modules of the UE 600.

In some aspects, the channel access module 608 is configured to perform the first CCA based on a first ED threshold and perform the second CCA based on a second ED threshold. The channel access module 608 is further configured to determine the second energy detection threshold based on a comparison of a signal energy measurement measured during the first CCA to a measurement threshold, where the measurement threshold is lower than the first ED threshold. The channel access module 608 may be further configured to determine the second ED threshold by assigning a first reference energy detection threshold to the second energy detection threshold in response to the signal energy measurement failing to satisfy the measurement threshold, or assigning a second reference energy detection threshold to the second energy detection threshold in response to the signal energy measurement satisfies the measurement threshold, where the second reference energy detection threshold is greater than the first reference energy detection threshold. The channel access module 608 is further configured to transmit in the shared radio frequency band upon passing the second CCA.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the channel access module 608 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., PUCCH, PUSCH, SUL data, CG-UL data, UL eMBB data, UL URLLC data) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., PDCCH, PDSCH, configured grants, dynamic scheduling grants, RRC configuration, LBT configuration, LBT configuration modification, COT SI, DL eMBB data, DL URLLC data) to the configured transmission module 607 for processing. The antennas 616 may include multiple antennas of similar or different designs in order to sustain multiple transmission links. The RF unit 614 may configure the antennas 616.

In some aspects, the processor 602 is configured to communicate with components of the UE 600 to perform, during a first time period, a first clear channel assessment (CCA) in a shared radio frequency band based on a first energy detection threshold, where performing the first CCA includes obtaining a signal energy measurement. The processor 602 is further configured to perform, during a second time period subsequent to the first time period, a second CCA in the shared radio frequency band based on a second energy detection threshold, where the second energy detection threshold is different from the first energy detection threshold and based on the signal energy measurement. The transceiver 610 is configured to communicate with components of the UE 600 to transmit, to a second wireless communication device (e.g., the BSs 105 and 500 and/or UEs 115) in the shared radio frequency band based on the second CCA, a communication signal. In some aspects, the transceiver 610 is configured to is configured to communicate, with a second wireless communication device (e.g., the BSs 105 and 500 and/or UEs 115), a communication signal in response to a successful LBT procedure performed by the channel access module 608.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
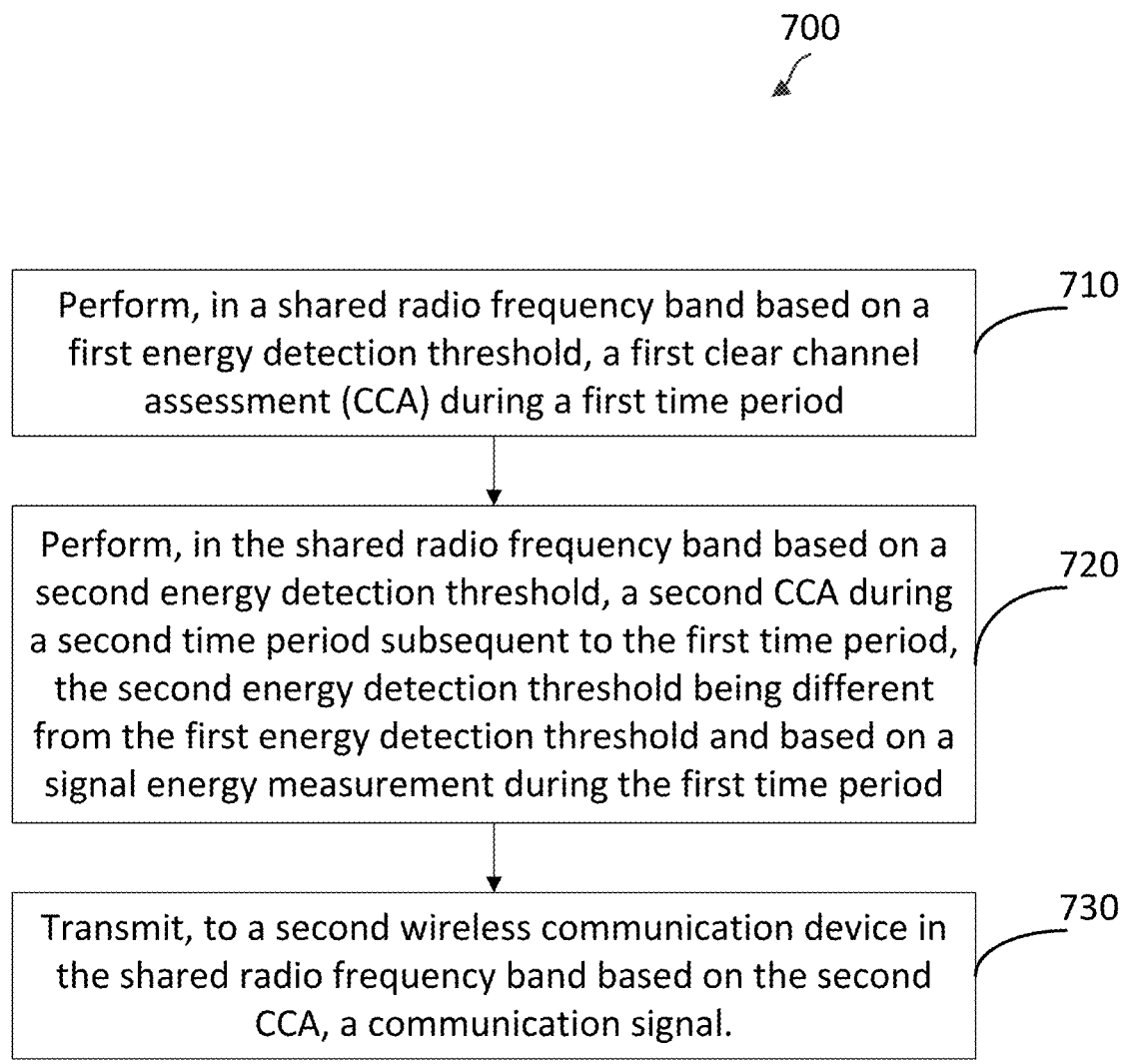
FIG. 7 is a flow diagram of a communication method according to some aspects of the present disclosure.

FIG. 7 is a flow diagram of a communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the BSs 105 and/or 500 may utilize one or more components, such as the processor 502, the memory 504, the channel access module 508, the transceiver 510, the modem 512, and the one or more antennas 516, to execute the steps of method 700. Alternatively, a wireless communication device, such as the UEs 115 and/or 600 may utilize one or more components, such as the processor 602, the memory 604, the channel access module 608, the transceiver 610, the modem 612, and the one or more antennas 616, to execute the steps of method 700. The method 700 may employ similar mechanisms as in the schemes 300, 400 discussed above with respect to FIGS. 3 and/or 4. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, a first wireless communication device, performs, during a first time period, a first clear channel assessment (CCA) in a shared radio frequency band based on a first ED threshold. Performing the first CCA may include obtaining at least one signal energy measurement. In some aspects, the at least one signal energy measurement may include a plurality of individual measured values associated with different times within the first time period, or may include a single signal energy measurement. The signal energy measurement may be obtained and/or analyzed in decibel milliwatts (dBm), or any other suitable unit. In some aspects, a duration of the first time period is determined based on a priority class associated with a communication signal to be transmitted by the first wireless communication device. In some instances, the first wireless communication device may utilize one or more components, such as the processor 502 or 602, the channel access module 508 or 608, the transceiver 510 or 610, the modem 512 or 612, and the one or more antennas 516 or 616, to perform the first CCA. The first CCA may be part of an LBT protocol that includes the first CCA and a second CCA, such as the LBT procedure 300 shown in FIG. 3. For instance, the first CCA may be performed during a deferral period, and the second CCA may be performed during a countdown period. In some aspects, performing the first CCA may be performed in a manner similar to that described with respect to the first CCA 310 in FIG. 3 and/or steps 404 and 406 in the method 400 of FIG. 4.

At block 720, the first wireless communication device performs, during a second time period subsequent to the first time period, a second CCA in the shared radio frequency band based on a second energy detection threshold. The second energy detection threshold is determined or selected based on the at least one signal energy measurement. The second energy detection threshold may be determined or selected based on a comparison of the at least one signal energy measurement to a measurement threshold that is different from the first energy detection threshold. In some aspects, determining the second ED threshold includes assigning a first reference ED threshold to the second ED threshold in response to the at least one signal energy measurement failing to satisfy (e.g., not exceeding) the measurement threshold, or assigning a second reference ED threshold to the second ED threshold in response to the at least one signal energy measurement satisfying the measurement threshold, wherein the second reference ED threshold is greater than the first reference ED threshold. In some aspects, the first reference ED threshold is the same as the first ED threshold. In some aspects, the first reference ED threshold is different from the first ED threshold. In some aspects, the measurement threshold is lower than the first ED threshold. For example, in some aspects, the first ED threshold is −72 dBm, and the measurement threshold is −82 dBm. In some aspects, the second time period of the second CCA is determined based on a random number, or a random back-off. In some instances, the first wireless communication device may utilize one or more components, such as the processor 502 or 602, the channel access module 508 and 608, the transceiver 510 or 610, the modem 512 or 612, and the one or more antennas 516 or 616, to perform the second CCA.

At block 730, the first wireless communication device transmits, to the second wireless communication device in the shared radio frequency band based on the second CCA, a communication signal. In some instances, the first wireless communication device may utilize one or more components, such as the processor 502 or 602, the channel access module 508 and 608, the transceiver 510 or 610, the modem 512 or 612, and the one or more antennas 516 or 616, to transmit the communication signal.

In some aspects, the first wireless communication device may correspond to a BS (e.g., the BSs 105, 500) and the second wireless communication device may correspond to a UE (e.g., the UEs 115, 600). Accordingly, a BS may perform the first CCA at block 710, perform the second CCA at block 720, and transmit the communication signal to the UE at block 730.

In some aspects, the first wireless communication device may correspond to a UE (e.g., the UEs 115, 600) and the second wireless communication device may correspond to a BS (e.g., the BSs 105, 500). In another aspects, the first wireless communication device may correspond to a UE (e.g., the UEs 115, 600) and the second wireless communication device may correspond to another UE. Accordingly, a UE may perform the first CCA at block 710, perform the second CCA at block 720, and transmit the communication signal to the BS or the UE at block 730.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Aspects of the present disclosure include the following:
1. A method of wireless communication performed by a first wireless communication device, the method comprising:
    performing, during a first time period, a first clear channel assessment (CCA) in a shared radio frequency band based on a first energy detection threshold, wherein performing the first CCA comprises obtaining at least one signal energy measurement;
    performing, during a second time period subsequent to the first time period, a second CCA in the shared radio frequency band based on a second energy detection threshold, the second energy detection threshold being based on the at least one signal energy measurement; and
    transmitting, to a second wireless communication device in the shared radio frequency band based on the second CCA, a communication signal.
2. The method of clause 1, further comprising determining a duration of the first time period based on a priority class associated with the communication signal.
3. The method of any of clauses 1 or 2, further comprising determining a duration of the second time period based on a random back-off.
4. The method of any of clauses 1-3, further comprising determining the second energy detection threshold based on a comparison of the at least one signal energy measurement to a measurement threshold, wherein the measurement threshold is lower than the first energy detection threshold.
5. The method of clause 4, wherein the determining the second energy detection threshold further comprises:
    assigning a first reference energy detection threshold to the second energy detection threshold in response to the at least one signal energy measurement failing to satisfy the measurement threshold; or
    assigning a second reference energy detection threshold to the second energy detection threshold in response to the at least one signal energy measurement satisfying the measurement threshold, the second reference energy detection threshold being greater than the first reference energy detection threshold.
6. The method of clause 5, wherein the first reference energy detection threshold is the same as the first energy detection threshold.
7. The method of any of clauses 1-6, wherein the first energy detection threshold is approximately −72 dBm.
8. The method of any of clauses 1-7, wherein the first wireless communication device comprises a base station.
9. The method of any of clauses 1-7, wherein the first wireless communication device comprises a user equipment.
10. An apparatus comprising:
    a processor configured to:
        perform, during a first time period, a first clear channel assessment (CCA) in a shared radio frequency band based on a first energy detection threshold, wherein performing the first CCA comprises obtaining at least one signal energy measurement; and
        perform, during a second time period subsequent to the first time period, a second CCA in the shared radio frequency band based on a second energy detection threshold, the second energy detection threshold being based on the at least one signal energy measurement; and
    a transceiver configured to:
        transmit, to a wireless communication device in the shared radio frequency band based on the second CCA, a communication signal.
11. The apparatus of clause 10, wherein the processor is further configured to:
    determine a duration of the first time period based on a priority class associated with the communication signal.
12. The apparatus of any of clauses 10 or 11, wherein the processor is further configured to:
    determine a duration of the second time period based on a random back-off.
13. The apparatus of any of clauses 10-12, wherein the processor is further configured to:
    determine the second energy detection threshold based on a comparison of the at least one signal energy measurement to a measurement threshold, wherein the measurement threshold is lower than the first energy detection threshold.
14. The apparatus of clause 13, wherein the processor configured to determine the second energy detection threshold is further configured to:
    assign a first reference energy detection threshold to the second energy detection threshold in response to the at least one signal energy measurement failing to satisfy the measurement threshold; or
    assign a second reference energy detection threshold to the second energy detection threshold in response to the at least one signal energy measurement satisfies the measurement threshold, the second reference energy detection threshold being greater than the first reference energy detection threshold.

15. The apparatus of clause 14, wherein the first reference energy detection threshold is the same as the first energy detection threshold.

16. The apparatus of any of clauses 10-15, wherein the first energy detection threshold is approximately −72 dBm.

17. The apparatus of any of clauses 10-16, wherein the apparatus is a base station.

18. The apparatus of any of clauses 10-16, wherein the apparatus is a user equipment.

19. A non-transitory computer-readable medium having program code recorded thereon, the program code comprising:
   code for causing a first wireless communication device to perform, during a first time period, a first clear channel assessment (CCA) in a shared radio frequency band based on a first energy detection threshold, wherein performing the first CCA comprises obtaining at least one signal energy measurement;
   code for causing the first wireless communication device to perform, during a second time period subsequent to the first time period, a second CCA in the shared radio frequency band based on a second energy detection threshold, the second energy detection threshold being based on the at least one signal energy measurement; and
   code for causing the first wireless communication device to transmit, to a second wireless communication device in the shared radio frequency band based on the second CCA, a communication signal.

20. The non-transitory computer-readable medium of clause 19, wherein the program code further comprises code for causing the first wireless communication device to determine a duration of the first time period based on a priority class associated with the communication signal.

21. The non-transitory computer-readable medium of any of clauses 19 or 20, wherein the program code further comprises code for causing the first wireless communication device to determine a duration of the second time period based on a random back-off.

22. The non-transitory computer-readable medium of any of clauses 19-21, wherein the program code further comprises code for causing the first wireless communication device to determine the second energy detection threshold based on a comparison of the at least one signal energy measurement to a measurement threshold, wherein the measurement threshold is lower than the first energy detection threshold.

23. The non-transitory computer-readable medium of clause 22, wherein the code for causing the first wireless communication device to determine the second energy detection threshold is further configured to:
   assign a first reference energy detection threshold to the second energy detection threshold in response to the at least one signal energy measurement failing to satisfy the measurement threshold; or
   assign a second reference energy detection threshold to the second energy detection threshold in response to the at least one signal energy measurement satisfies the measurement threshold, the second reference energy detection threshold being greater than the first reference energy detection threshold.

24. The non-transitory computer-readable medium of clause 23, wherein the first reference energy detection threshold is the same as the first energy detection threshold.

25. The non-transitory computer-readable medium of any of clauses 19-24, wherein the first energy detection threshold is approximately −72 dBm.

26. The non-transitory computer-readable medium of any of clauses 19-25, wherein the first wireless communication device comprises a base station.

27. The non-transitory computer-readable medium of any of clauses 19-26, wherein the second wireless communication device comprises a user equipment.

28. An apparatus comprising:
   means for performing, during a first time period, a first clear channel assessment (CCA) in a shared radio frequency band based on a first energy detection threshold, wherein performing the first CCA comprises obtaining at least one signal energy measurement;
   means for performing, during a second time period subsequent to the first time period, a second CCA in the shared radio frequency band based on a second energy detection threshold, the second energy detection threshold being based on the at least one signal energy measurement; and
   means for transmitting, to a wireless communication device in the shared radio frequency band based on the second CCA, a communication signal.

29. The apparatus of clause 28, further comprising means for determining a duration of the first time period based on a priority class associated with the communication signal.

30. The apparatus of any of clauses 28 or 29, further comprising means for determining a duration of the second time period based on a random back-off.

31. The apparatus of any of clauses 28-30, further comprising means for determining the second energy detection threshold based on a comparison of the at least one signal energy measurement to a measurement threshold, wherein the measurement threshold is lower than the first energy detection threshold.

32. The apparatus of clause 31, wherein the means for determining the second energy detection threshold is further configured to:
   assign a first reference energy detection threshold to the second energy detection threshold in response to the at least one signal energy measurement failing to satisfy the measurement threshold; or
   assign a second reference energy detection threshold to the second energy detection threshold in response to the at least one signal energy measurement satisfies the measurement threshold, the second reference energy detection threshold being greater than the first reference energy detection threshold.

33. The apparatus of clause 32, wherein the first reference energy detection threshold is the same as the first energy detection threshold.

34. The apparatus of any of clauses 28-33, wherein the first energy detection threshold is approximately −72 dBm.

35. The apparatus of any of clauses 28-34, wherein the wireless communication device comprises a base station.

36. The apparatus of any of clauses 28-34, wherein the wireless communication device comprises a user equipment.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). The terms "about" or "approximately" may be used to denote a range of +/−2%, unless specified otherwise.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:
   performing, during a deferral period of a listen-before talk (LBT) procedure, a first clear channel assessment (CCA) in a shared radio frequency band based on a first energy detection threshold, wherein performing the first CCA comprises obtaining at least one signal energy measurement;
   performing, during a countdown period of the LBT procedure subsequent to the deferral period, a second CCA in the shared radio frequency band based on a second energy detection threshold, wherein the second energy detection threshold is higher than the first energy detection threshold, and wherein the performing the second CCA based on the second energy detection threshold is based on the at least one signal energy measurement satisfying a measurement threshold that is lower than the first energy detection threshold; and
   transmitting, to a second wireless communication device in the shared radio frequency band based on the second CCA, a communication signal.

2. The method of claim 1, further comprising determining a duration of the deferral period based on a priority class associated with the communication signal.

3. The method of claim 1, further comprising determining a duration of the countdown period based on a random back-off.

4. The method of claim 1, further comprising determining the second energy detection threshold based on a comparison of the at least one signal energy measurement to the measurement threshold.

5. The method of claim 4, wherein the determining the second energy detection threshold further comprises:
   assigning a first reference energy detection threshold to the second energy detection threshold in response to the at least one signal energy measurement failing to satisfy the measurement threshold; or
   assigning a second reference energy detection threshold to the second energy detection threshold in response to the at least one signal energy measurement satisfying the measurement threshold, the second reference energy detection threshold being greater than the first reference energy detection threshold.

6. The method of claim 5, wherein the first reference energy detection threshold is the same as the first energy detection threshold.

7. The method of claim 1, wherein the first energy detection threshold is approximately −72 dBm.

8. The method of claim 1, wherein the first wireless communication device comprises a base station.

9. The method of claim 1, wherein the first wireless communication device comprises a user equipment.

10. An apparatus comprising:
    a processor configured to:
       perform, during a deferral period of a listen-before talk (LBT) procedure, a first clear channel assessment (CCA) in a shared radio frequency band based on a first energy detection threshold, wherein performing the first CCA comprises obtaining at least one signal energy measurement; and
       perform, during a countdown period of the LBT procedure subsequent to the deferral period, a second CCA in the shared radio frequency band based on a second energy detection threshold, wherein the second energy detection threshold is higher than the first energy detection threshold, and wherein the performing the second CCA based on the second energy detection threshold is based on the at least one signal energy measurement satisfying a measurement threshold that is lower than the first energy detection threshold; and
    a transceiver configured to:
       transmit, to a wireless communication device in the shared radio frequency band based on the second CCA, a communication signal.

11. The apparatus of claim 10, wherein the processor is further configured to:
    determine a duration of the deferral period based on a priority class associated with the communication signal.

12. The apparatus of claim 10, wherein the processor is further configured to:
    determine a duration of the countdown period based on a random back-off.

13. The apparatus of claim 10, wherein the processor is further configured to:
    determine the second energy detection threshold based on a comparison of the at least one signal energy measurement to the measurement threshold.

14. The apparatus of claim 13, wherein the processor configured to determine the second energy detection threshold is further configured to:
    assign a first reference energy detection threshold to the second energy detection threshold in response to the at least one signal energy measurement failing to satisfy the measurement threshold; or
    assign a second reference energy detection threshold to the second energy detection threshold in response to the at least one signal energy measurement satisfies the measurement threshold, the second reference energy detection threshold being greater than the first reference energy detection threshold.

15. The apparatus of claim 14, wherein the first reference energy detection threshold is the same as the first energy detection threshold.

16. The apparatus of claim 10, wherein the first energy detection threshold is approximately −72 dBm.

17. A non-transitory computer-readable medium having program code recorded thereon, the program code comprising:
   code for causing a first wireless communication device to perform, during a deferral period of a listen-before talk (LBT) procedure, a first clear channel assessment (CCA) in a shared radio frequency band based on a first energy detection threshold, wherein performing the first CCA comprises obtaining at least one signal energy measurement;
   code for causing the first wireless communication device to perform, during a countdown period of the LBT procedure subsequent to the deferral period, a second CCA in the shared radio frequency band based on a second energy detection threshold, wherein the second energy detection threshold is higher than the first energy detection threshold, and wherein the performing the second CCA based on the second energy detection threshold is based on the at least one signal energy measurement satisfying a measurement threshold that is lower than the first energy detection threshold; and
   code for causing the first wireless communication device to transmit, to a second wireless communication device in the shared radio frequency band based on the second CCA, a communication signal.

18. The non-transitory computer-readable medium of claim 17, wherein the program code further comprises code for causing the first wireless communication device to determine a duration of the deferral period based on a priority class associated with the communication signal.

19. The non-transitory computer-readable medium of claim 17, wherein the program code further comprises code for causing the first wireless communication device to determine a duration of the countdown period based on a random back-off.

20. The non-transitory computer-readable medium of claim 17, wherein the program code further comprises code for causing the first wireless communication device to determine the second energy detection threshold based on a comparison of the at least one signal energy measurement to the measurement threshold.

21. The non-transitory computer-readable medium of claim 20, wherein the code for causing the first wireless communication device to determine the second energy detection threshold is further configured to:
   assign a first reference energy detection threshold to the second energy detection threshold in response to the at least one signal energy measurement failing to satisfy the measurement threshold; or
   assign a second reference energy detection threshold to the second energy detection threshold in response to the at least one signal energy measurement satisfies the measurement threshold, the second reference energy detection threshold being greater than the first reference energy detection threshold.

22. The non-transitory computer-readable medium of claim 21, wherein the first reference energy detection threshold is the same as the first energy detection threshold.

23. An apparatus comprising:
   means for performing, during a deferral period of a listen-before talk (LBT) procedure, a first clear channel assessment (CCA) in a shared radio frequency band based on a first energy detection threshold, wherein performing the first CCA comprises obtaining at least one signal energy measurement;
   means for performing, during a countdown period of the LBT procedure subsequent to the deferral period, a second CCA in the shared radio frequency band based on a second energy detection threshold, wherein the second energy detection threshold is higher than the first energy detection threshold, and wherein the performing the second CCA based on the second energy detection threshold is based on the at least one signal energy measurement satisfying a measurement threshold that is lower than the first energy detection threshold; and
   means for transmitting, to a wireless communication device in the shared radio frequency band based on the second CCA, a communication signal.

24. The apparatus of claim 23, further comprising means for determining a duration of the deferral period based on a priority class associated with the communication signal.

25. The apparatus of claim 23, further comprising means for determining a duration of the countdown period based on a random back-off.

26. The apparatus of claim 23, further comprising means for determining the second energy detection threshold based on a comparison of the at least one signal energy measurement to the measurement threshold.

27. The apparatus of claim 26, wherein the means for determining the second energy detection threshold is further configured to:
   assign a first reference energy detection threshold to the second energy detection threshold in response to the at least one signal energy measurement failing to satisfy the measurement threshold; or
   assign a second reference energy detection threshold to the second energy detection threshold in response to the at least one signal energy measurement satisfies the measurement threshold, the second reference energy detection threshold being greater than the first reference energy detection threshold.

28. The apparatus of claim 27, wherein the first reference energy detection threshold is the same as the first energy detection threshold.

29. The apparatus of claim 23, wherein the wireless communication device comprises a base station.

30. The apparatus of claim 23, wherein the wireless communication device comprises a user equipment.

* * * * *